United States Patent Office 3,728,223
Patented Apr. 17, 1973

3,728,223
PRODUCTION OF HYALURONIDASE FROM A STRAIN OF STREPTOMYCES
Yasuyuki Kaneko, Takaichi Ohya, and Genichi Amano, Aichi Prefecture, and Hitoshi Oiwa, Saitama Prefecture, Japan, assignors to Amano Seiyaku Kabushiki Kaisha, Naka-ku, Nagoya, Japan
No Drawing. Continuation of abandoned application Ser. No. 784,460, Dec. 17, 1968. This application Oct. 8, 1971, Ser. No. 187,851
Int. Cl. C07g 7/028
U.S. Cl. 195—62
9 Claims

ABSTRACT OF THE DISCLOSURE

A novel hyaluronidase is produced by cultivating a new strain of Streptomyces hyalurolyticus.

---

This application is a continuation-in-part application of Ser. No. 784,460, filed Dec. 17, 1968 now abandoned.

This invention relates to the use of a new *Streptomyces Hyalurolyticus* in the production of a novel hyaluronidase, and to a method for the preparation of the hyaluronidase by cultivating the strain of the new *Streptomyces hyalurolyticus*.

Hyaluronidase is an enzyme for depolymerizing the hyaluronic acid to produce a low molecular weight sugar derivative. It is well known that the enzyme is contained in the testicle secretion of mammals, and is called the spreading factor. Also K. Meyer et al. have separated an enzyme from the crystalline lens of an eye ball and also have found that an autolyzated product produced by the action of Pneumococcus decreases the viscosty of mucopolysaccharides and depolymerizes them to produce a reducing sugar. The enzyme is named by K. Meyer et al. as the hyaluronidase which corresponds to the spreading factor.

Tihs hyaluronidase is found widely in the skin, spleen, testicle and semen of animals, the venom of bees and snakes, and the connective tissue of tadpoles. It is also found as the exoenzyme of pathtogenic bacteria in microorganisms such as *Clostridium welchii*, *Streptococcus hemolyticus*, *Staphylococcus aures*, Pneumococcus and the like. Such an enzyme acts to regulate the tissue permeability and the fertilization of animals, and should be evaluated based on the permeation of toxin secreted by bacteria, and the nutrition of humans. Such an enzyme, which is physiologically and pathologically important, is used clinically. A commercially available hyaluronidase is produced from the bovine testicle and therefore the production of hyaluronidase is limited by the source. Also the hyaluronidase of the bovine testicle or bacteria has the defect that it becomes unstable during purification.

It is noted that heretofore there has not been found any hyaluronidase contained in microorganisms other than bacteria. The present inventors have searched non-pathogenic microorganisms as a source of the hyaluronidase and have discovered that new species belonging to Streptomyces, which are isolated from soil, can accumulate a large amount of the stable hyaluronidase in a culture broth. The new species belonging to Streptomyces is recorded as the hyaluronidase-producing Streptomyces sp. No. 81–10, and is named as *Streptomyces hyalurolyticus* nov. sp. by the inventors.

The mycological characteristics of the *Streptomyces hyalurolyticus* nov. sp. (Streptomyces sp. No. 81–10) are listed as follows and identified by the methods disclosed in "Bergey's Manual of Determinative Bacteriology," 7th edition (1957) and "The Actinomycetes," vol. II (1961) by S. A. Waksman.

(I) MORPHOLOGICAL CHARACTERISTICS (1) Spore bearing hyphae: Simple, no verticillate, sporaphores straight or partial flexous, no spirals.

(2) Spores: Elliptical, 1.0 x 0.7$\mu$, surface smooth, produce chain and more than ten spores.

(3) (i) Globular sporangia: None. (ii) Flagellated spore: None. (iii) Sclerotia: None.

(4) Aerial mycelium: Produce.

(5) Vegetative mycelium: Thinner than aerial mycelium, no segmentation, no septum.

(II) CULTURAL CHARACTERISTICS

Unless special mention is made, the cultural characteristics are observed after ten days cultivation at 30° C. The citation of color in various cultures is based upon "Standard of Color" published by Japan Color Research Institute.

| Medium | Growth | Aerial mycelium | Soluble pigment |
|---|---|---|---|
| (1) Nutrient agar | Moderate, ivory yellow, luster, surface yeast-like | None | Yellowish brown. |
| (2) Sucrose-nitrate agar | Moderate, surface yeast-like wrinkled (under) | Scanty, white | Do. |
| (3) Synthetic agar | Moderate, white | Reverse brownish white pale orange, late. | Pale yellowish brown. |
| (4) Glucose-asparagin agar | Moderate, white thin | Scanty, reverse white to pale orange | Do. |
| (5) Ca-malate agar | Scanty, colorless | Scanty, white | None. |
| (6) Glucose-peptone agar | Moderate, pale yellowish brown yeast-like after wrinkled (under). | Scanty, grayish white | Dark yellowish brown. |
| (7) Egg Agar | Moderate, reverse cream to brown, surface wrinkled. | Moderate white | Brownish black. |
| (8) Potato plug | Abundant, yellowish brown, umbonate wrinkled | Moderate, reverse to grayish white | Dark yellowish brown. |
| (9) Carrot plug | None | None | None. |
| (10) Oatmeal agar | Abundant, white flat | Abundant, reverse white to pale orange and to pinkish white. | Camell (yellowish brown). |
| (11) Tyrosine agar | Scanty, colorless | None or scanty, white | Dark brown. |
| (12) Gelatin stab | Colorless or cream, crateriform or stratiform, liquefaction strong. | None | Dark reddish brown. |
| (13) Milk | Abundant, white or cream, surface ring, coagulation, peptonization slowly, litomus no reduction. | Scanty, white | Dark yellow. |
| (14) Cellulose media | None | None | None. |
| (15) Peptone solution | Abundant, membranous, reverse white to grayish white, no turbidic. | do | Deep brown. |
| (16) Nutrient broth | Abundant, membranous dull white, produce mycelial mat, no turbidic. | None or scanty | Light brown. |

(III) PHYSIOLOGICAL PROPERTIES (1) Aerobic or anaerboic: aerobic.

(2) The temperature range for growth and optimum temperature: 18°–40° C., 27°–30° C.

(3) The pH range for growth and optimum pH: 5–11, 7–8.

(4) Utilization of carbon sources: arabinose +, xylose +, glucose +, mannose +, fructose +, lactose +, sucrose +, inositol —, rhamnose —, raffinose +, salicin +, mannitol —, glycerin +, starch +, dextrin +, inulin +, galactose +, maltose +, sorbitol —.

(5) Liquefaction of gelatin (proteolytic action): positive (strong).
(6) Coagulation and petonization of milk (proteolytic action): positive (strong).
(7) Hydrolysis of starch (amylolytic action): positive (strong).
(8) Utilization of cellulose (cellulolytic action): negative.
(9) Nitrate reduction: positive.
(10) Tyrosiase (melanin formation): positive.
(11) Chromogenic action: positive.
(12) Hemolysis: negative.
(13) Hydrogen sulfide production: positive.
(14) Catalyase production: negative.
(15) Indol production: negative.
(16) Extinct temperature: 55° C. (10 mins.).

As is obvious from the fact that the Streptomyces sp. No. 81–10 promotes the growth of hyphae, produces the vegetative mycelium having no segment and does not form the sporangium, it evidently belongs to the family Streptomycetaceae. Also, the Streptomyces sp. No. 81–10 cannot grow at a temperature of above 50° C., produces ten or more spores which are connected with each other into a chain-like state and has aerial mycelium, and therefore the microorganism falls within the genus Streptomyces. Further, it is considered that the Streptomyces sp. No. 81–10 belongs to the A–II group according to the classification by Waksman, as it is a microbe of the chromogenic type which does not form the verticillate. This A–II group contains 69 species, but they are different from the Streptomyces sp. No. 81–10 in growth and color and in that the spore bearing hyphae does not form spirals. Of the 69 species, it is considered that the 5 *Streptomyces tanashiensis*, *Streptomyces griseochromogenes*, *Streptomyces garyphalus*, *Streptomyces bikiniensis*, and *Streptomyces mirabilis* are similar to the Streptomyces sp. No. 81–10, but they have been tested and proved different from the Streptomyces sp. No. 81–10, as shown in following Table 1.

TABLE 1
[Comparison of Streptomyces sp. No. 81–10 and several similar strains]

| | | No. 81–10 |
|---|---|---|
| *St. tanashiensis* | | |
| Nitrate reduction | − | + |
| Optium pH | 5.8~6.5 | 7.0~8.0. |
| Carbon utilization | Sucrose−, raffinose−, inulin−, sorbitol+. | Opposite. |
| Sucrose nitrate agar | G: grayish-yellow | White. |
| *St. griseochromogenes* | | |
| Starch agar | Form closed spirals | No spirals. |
| Tyrosine agar | G: orange colored | White. |
| | SP: none | Dark brown. |
| Milk coagulation | None | Rapid. |
| Sucrose-nitrate agar | G: orange-cinnamon | White. |
| Carbon utilization | Inositol+, inulin−, salicin−. | Opposite. |
| *St. garyphalus* | | |
| Nutrient agar | G: colorless | Cream colored. |
| | AM: grayish-white | White. |
| Potato | AM: grayish-black | Do. |
| Milk | SP: dark purple to brownish-purple. | Dark yellowish-brown. |
| Gelatin | SP: becomes greenish-brown when shaken. | Reddish-brown. |
| Ca-malate agar | AM: form | None. |
| Glucose-asparagine agar. | AP: none | Faint yellowish-brown. |
| *St. bikiniensis* | | |
| Nutrient agar | AM: moderate | None. |
| Milk coagulation | None | Rapid. |
| Glucose-asparagine agar. | SP: light amber | Faint yellowish-brown. |
| Sucrose-nitrate agar | Superficial droplets amber-colored. | No droplet. |
| Gelatin | Slight liquefaction | Strong liquefaction. |
| Starch agar | Hydrolysis slight | Strong hydrolysis. |
| | G: abundant | Moderate. |

TABLE 1—Continued

| | | No. 81–10 |
|---|---|---|
| *St. mirabilis* | | |
| Growth temperature | No growth at 37° C | Good growth at 37° C. |
| Optimum pH | 6.0~6.6 | 7.0~8.0. |
| Milk | SP: black | Dark yellowish-brown. |
| | Reaction of medium unchanged. | pH changed from 6.2 to 8.2 for two weeks. |
| | AM: fluffy | Scanty, not fluffy. |
| Gelatin | SP: dark brown to black. | Dark reddish-brown. |
| | Flaky growth | Not flaky. |

NOTE.—Abbreviations: G=growth; AM=aerial mycelium; SP=soluble pigment.

Taking into consideration the above mentioned factors and the fact that the Streptomyces sp. No. 81–10 produces the new hyaluronidase, it can be recognized that the Streptomyces sp. No. 81–10 is a new species, which is named as *Streptomyces hyalurolyticus* nov. sp., based on its physiological properties.

The *Streptomyces hyalurolyticus* nov. sp. was deposited at Fermentation Research Institute, Agency of Industrial Science and Technology, No. 8—1 Inage, Higashi-5-chrome, Chiba-shi, Chiba-ken, Japan, under number FERM–P–427 (and also at Institute of Applied Microbiology, Tokyo University, Japan, under number I.A.M. 18012).

As is well known, the Streptomyces changes its own properties when it is grown on the various media, and therefore it will be understood that this invention includes the use of the new species and artificially modified strains for producing the hyaluronidase.

The *Streptomyces hyalurolyticus* nov. sp. FERM–P–427 can be cultivated on a medium, which is used for the preparation of hyaluronidase, by using conventional culture methods such as an aerobic solid culture, a submerged culture and the like. A preferred culture method is a shaking culture or submerged culture.

The culture medium contains glycerin, glucose, soluble starch, sucrose or dextrin as a carbon source, casamino acid, peptone, meat extract, malt extract, corn-steep-liquor, de-fatted soybean powder, yeast extract, urea or ammonium salts as nitrogen source, various kinds of phosphates, sodium chloride or $MgSO_4 \cdot 7H_2O$ as an inorganic salt, and optionally defoamers and other additives. It is preferable to use soluble starch or dextrin as the carbon source, and yeast extract, casamino acid or $(NH_4)_2SO_4$ as the nitrogen source.

When the *Streptomyces hyalurolyticus* nov. sp. FERM–P–427 is inoculated on such a culture medium and then cultivated at a temperature of 27 to 30° C. for 48 to 96 hours under aeration, the production of hyaluronidase reaches a maximum. The pH value of the culture broth may be lowered depending on the culture medium used. but the *Stretptomyces hyalurolyticus* nov. sp. FERM–P–427 is not affected by the growth and production of the new hyaluronidase. If calcium carbonate is added to a culture medium, the production of hyaluronidase may occasionally be lowered.

For obtaining a crude hyaluronidase, at first the cells are removed from the culture broth by means of a suitable procedure and then the resultant culture filtrate, or concentrated culture filtrate which is produced by concentrating the culture filtrate under reduced pressure, is treated by a solvent precipitation procedure or a salting out procedure.

The organic solvents used in this invention include ethyl alcohol, methyl alcohol and acetone. The salts used for the salting out procedure include ammonium sulfate and magnesium sulfate.

The crude hyaluronidase contains a large amount of a melanin type brown pigment which is produced by the *Streptomyces hyalurolyticus* nov. sp. FERM–P–427 and other coloring matters which are derived from the culture medium, and such pigment and coloring matters cannot be completely removed by the conventional purifying procedures, and the purified hyaluronidase cannot be recovered in high yield.

A method for removing the coloring matters, thus purifying the crude hyaluronidase and obtaining the enzyme in high yield, is illustrated below. The anion-exchange resins and the adsorbent synthetic resins used can be re-used by washing with acids and alkalis. Such resins need no bufferization procedure.

At first, an anion-exchange resin is washed with a 2 Normal solution of hydrochloric acid and a 2 Normal solution of sodium hydroxide and then the resin is washed with water until the effluent water has a pH value of 5 to 6. The washed resin is charged into a column and then a solution containing the crude hyaluronidase is passed through the column. The pH value of the resultant effluent is varied from 5 to 9 and therefore the pH value is adjusted to about 5.0 with a 1 Normal solution of hydrochloric acid to the effluent.

The effluent is then passed through a layer of an adsorbent sysnthetic resin, which is charged into a column and treated with acid and alkali in the same manner as mentioned above, and the pH value of the resultant effluent is adjusted to about 5.0 by adding the 1 Normal solution of hydrochloric acid to the effluent.

Finally, the effluent is passed through a layer of a bufferized, weak cation-exchange resin having a pH value of 4 to 5 to absorb the hyaluronidase on the cation-exchange resin. The adsorbed hyaluronidase can be removed from the cation-exchange resin by dissolving it with a 0.5 mol acetate buffer solution. The product is the purified colorless hyaluronidase.

The anion-exchange resins used in this invention include Duolite A–2, A–4, A–6 and A–7, which are manufactured by Diamond Alkali Company, Amberlite and XE–225 which is manufactured by Rohm and Haas. The adsorbent synthetic resins used in this invention include Duolite ES–33 and Duolite ES–30 which are manufactured by Diamond Alkali Company. The cation-exchange resins used include Duolite ES–80 and Duolite CS–101 which are manufactured by Diamond Alkali Company, and Amberlite IRC–50 and Amberlite XE–64 which are manufactured by Rohm and Haas. In addition to such resins, it is noted that diethylaminoethyl cellulose (DEAE-cellulose) can be used for purifying the crude hyaluronidase.

This enzyme preparation has the activity to depolymerize hyaluronic acid to oligosaccharide, which is detected by reduction of aniline hydrogen phthalate, but it does not form N-acetylglucosamine and glucuronic acid. Also, such activity is demonstrated by breaking down a protein-turbidity forming power of hyaluronic acid and also by decreasing a high viscosity of the substrate solution by the enzyme. Quite different from testicular hyaluronidase, this enzyme cannot decompose chondroitin and chondroitin sulphate.

The optimum pH and temperature of the enzyme activity are 5.0 and 65–70° C. respectively. The stable pH range during 24 hr. at 37° C. is from 4 to 10. This enzyme is remarkably stable against heat and no appreciable decrease of activity takes place by heat treatment up to 75–80° C. for 30 min. A purified enzyme solution can be stored in the refrigerator for more than one month, without any accompanying decrease of activity. In contrast to testicular or pneumococcal hyaluronidase, $Hg^{++}$ and $Mn^{++}$ ions inhibit the enzyme. A comparison of enzyme properties of testicular, bacterial and Streptomyces hyaluronidases is shown in Table 2.

TABLE 2

| | Animal hyaluronidase | Bacterial hyaluronidase | New hyaluronidase |
|---|---|---|---|
| Source | Bovine testicle | Clostridium welchii, Streptococcus hemalyticus, Staphylococcus aureus. | Streptomyces hyalurolyticus nov. sp. FERM-P-427. |
| Substrate specificity | Hyaluronic acid, chondroitin, chondroitin sulfuric acid. | Hyaluronic acid, chondroitin | Hyaluronic acid. |
| Heat stability | Heat treatment (at 48° C., for 30 minutes): 50% residual activity. | Streptococcus heat treatment (at 45° C., 15 minutes): inactive. | Heat treatment (at 70° C., 30 minutes): 100% residual activity. |
| Do | Heat treatment (at 100° C., for 5 minutes): 80% residual activity. | Staphylococcus heat treatment (at 55° C., 5 minutes): 10% residual activity. | Heat treatment (at 80° C., 30 minutes): 95% residual activity. Very stable. |
| pH stability | Broad range | Down pH 5.0,[1] up pH 8.0 [1] | pH 4.0–11.0 broad range. |
| Optimum pH | 5.5–6.2 | 5.5–6.2 | 5.0. |
| Inhibitor | $Fe^{++}$, $Cu^{++}$, $Zn^{++}$ | $Fe^{++}$, $Zn^{++}$ | $Mn^{++}$, $Hg^{++}$. |

[1] Unstable.

From the above results the hyaluronidase produced by Streptomyces hyalurolyticus nov. sp. FERM-P-427 is proved to be clearly different from that of bacteria and animal. This is the first case microbial hyaluronidase has been found in sources other than pathogenic bacteria.

An assay of the hyaluronidase of this invention was performed by Tolksdorf's innovated method in which hyaluronic acid was prepared from umbilical cords by Dorfman's method. A solution containing approximately 1 mg./ml. of hyaluronic acid was prepared by dissolving the hyaluronic acid in a 0.02 M McIlvaine buffer (pH 5.0) containing 0.2 M NaCl. To perform the assay, 0.5 ml. of enzyme solution was mixed with 0.5 ml. of hyaluronic acid solution (solutions were previously prepared at 60° C.) and incubated at 60° C. for 30 minutes. At the end of this operation 4 ml. of acid horse serum diluted by 40 fold with the above buffer were added quickly, and exactly 10 minutes later the optical density was determined with a spectrophotometer at 660 m$\mu$. Controls were used with inactivated enzyme solution (heated at 100° C., 10 minutes) and performed by the same method. Under these conditions, 1 T.R.U. (turbidity reducing unit), defined as the enzyme concentration reducing the turbidity by half, was observed.

This invention is illustrated by the following examples.

EXAMPLE 1

100 ml. of a culture medium (pH 7.2) containing 2.5% glucose, 1.0% casamino acid, 0.5% $(NH_4)_2SO_4$, 0.25% yeast extract and 0.1% $K_2NPO_4$ were poured into a 500 ml. shaking flask. After sterilizing for 15 minutes at 120° C., the culture medium was inoculated with Streptomyces hyalurolyticus nov. sp. FERM-P-427 which was precultured on the same medium for 48 hours at 30° C., and then a shaking culture was conducted for 80 hours at 30° C. The cells were removed by filtration. The activity of hyaluronidase contained in the culture filtrate was 13 T.R.U./ml. The pH value of the culture filtrate was adjusted to 5.0 and was fractionated between 40% and 60% saturation with ammonium sulfate. The precipitate was collected and dissolved with a suitable amount of water. The solution was salted out and concentrated and the concentrate was dried under freezing. About 1.1 grams of the crude hyaluronidase were obtained from 1 liter of the culture filtrate. The activity of the powdered hyaluronidase was 10 T.R.U./mg.

EXAMPLE 2

10 liters of a culture medium (pH 7.2) containing 3.0% soluble starch, 0.5% pentose, 0.5% meat extract, 0.8% $(NH_4)_2SO_4$, 0.15% yeast extract and 0.1% $K_2HPO_4$ were poured into each of four 20-liter jar-fermenters. After sterilizing for 15 minutes at 120° C., the culture medium was inoculated with 200 ml. of *Streptomyces hyalurolyticus* nov. sp. FERM-P-427 which was precultured on the same medium, and a shaking culture was conducted for 40 hours at 30° C. under agitation (300 r.p.m.) and aeration (15 liter per minute). The resultant culture broth was filtered to remove the cells thus obtaining 32 liters of culture filtrate containing hyaluronidase having an activity of 25 T.R.U./ml. The culture filtrate was concentrated to 8 liters containing hyaluronidase having an activity of 94 T.R.U./ml. (pH=5.7). To the concentrate was added 28.0 liters of cold ethyl alcohol for producing a precipitate. The precipitate was washed with cold ethyl alcohol and then dried under reduced pressure and about 230 grams of a greyish white, crude enzyme powder were obtained. This crude enzyme has a hyaluronidase activity of 2.9 T.R.U./mg.

A 10% aqueous solution of this crude enzyme was passed through a layer of Duolite A-2 resin at the rate of 500 ml./hr. which had been previously washed with an acid and alkali, and then the resin was washed with water. Since the pH value of the resultant effluent was varied to about 9.0, the pH value was adjusted to 5.0 by adding a 1 Normal solution of hydrochloric acid. This operation removed about 90% or more of the coloring matter contained in the solution of crude enzyme.

Then, the purified solution was passed through a layer of Duolite ES-33 resin, which had been previously washed with an acid and alkali, and then the resin was washed with water in the same manner as mentioned above. The pH value of the resultant effluent was varied to about 8.5 and it was adjusted to 5.0 by using a 1 Normal solution of hydrochloric acid. This operation removed about 9.0% or more of the coloring matter contained in the original solution of the crude enzyme. The enzyme was recovered at a yield of about 73% and the specific activity of the enzyme was increased to about 4 times the original activity.

Finally, the effluent was dialyzed in a 0.01 mol buffer solution (pH=5.0) containing acetic acid at 5° C. for 24 hours and was then passed through a layer of Duolite ES-80 resin, which had been previously bufferized with the same buffer solution, for adsorbing the enzyme on the resin. The adsorbed enzyme was dissolved out from the resin by passing a 0.2 to 0.5 mole buffer solution containing acetic acid through the layer of resin. By carrying out this operation, all the excess coloring matter in the original solution was removed and a clear effluent was obtained. The clear effluent was dialyzed at a low temperature, concentrated under reduced pressure and dried under freezing for obtaining about 5 grams of the purified enzyme having a specific activity of 2297 T.R.U./mg. The enzyme was recovered at a yield of about 64%.

EXAMPLE 3

250 liters of the same culture medium as in Example 2 were poured into a 500 liter fermenter and the culture medium was inoculated with *Streptomyces hyalurolyticus* nov. sp. FERM-P-427 at 30° C. for 45 hours under agitation (200 r.p.m.) and aeration (1:1). About 1.3 kg. of a grayish white, crude enzyme powder were obtained. The crude emzyme had a hyaluronidase activity of 2.5 T.R.U./mg. 160 grams of the crude enzyme were dissolved in water to produce a 10% solution. The solution was passed through a layer of Duolite A-7 resin, which had been previously washed with an acid and alkali, and then washed with water at the flow rate of 500 ml./hr. The pH value of the resultant effluent was adjusted to 5.0 by adding a 1 Normal solution of hydrochloric acid to the effluent. Then the effluent was passed through a layer of Duolite ES-33 resin which had been previously washed with an acid and alkali, and then washed with water. The pH value of the resultant effluent was adjusted to 4.1 and the effluent was dialyzed in a 0.05 mol buffer solution (pH=4.1) containing acetic acid at 5° C. The dialyzed effluent was passed through a layer of Duolite CS-101 resin, which is a weak acidic cation-exchange resin and bufferized with a 0.05 mol buffer solution (pH=4.1) containing acetic acid, for adsorbing the hyaluronidase on the resin. The hyaluronidase was dissolved out from the resin by treating it with a 0.5 mol buffer solution (pH=6.0) containing acetic acid and the hyaluronidase-containing solution was dialyzed for 24 hours in a 0.01 mol buffer solution (pH=4.1). The dialyzed solution was passed through a layer of diethylamino ethyl cellulose, which had been previously bufferized with a 0.01 mol buffer solution, for adsorbing impurities on the cellulose and obtaining an effluent which contains the hyaluronidase. The effluent was dialyzed in a 0.005 mol buffer solution (pH=8.0) containing phosphoric acid and then the dialyzed effluent was passed through a layer of diethylaminoethyl cellulose, which had been previously bufferized with a 0.005 mol buffer solution, for adsorbing the hyaluronidase on the cellulose. The adsorbed hyaluronidase was dissolved out from said diethylaminoethyl cellulose by treating it with a 0.05 mol buffer solution containing phosphoric acid. By carrying out this operation, all the coloring matter was removed and a clear solution was obtained. The specific activity of the clear solution was increased to about 80 times the original activity. The enzyme was recovered at a yield of about 30%.

What is claimed is:

1. Hyaluronidase, characterized in that it can depolymerize hyaluronic acid only, is stable against heat and does not lose its activity at a temperature of 70° C. to 80° C., has an optimum pH of 5.0 and optimum temperature of 60° C. for growth, and is stable at pH values ranging from 4.0 to 11.0.

2. A method for preparing the hyaluronidase of claim 1, comprising cultivating (*Streptomyces hyalurolyticus* nov. sp. FERM-P-427 on a suitable culture medium containing a carbon source, a nitrogen source and an inorganic salt to produce a culture broth containing the hyaluronidase and recovering the hyaluronidase from the culture broth.

3. The method according to claim 2, wherein the culture broth is filtered to collect a culture filtrate containing the hyaluronidase and the filtrate is concentrated, purified and dried to produce a substantially pure hyaluronidase.

4. The method according to claim 3, wherein the hyaluronidase is collected from the concentrated culture filtrate by precipitation with an organic solvent or salting out.

5. The method according to claim 2, wherein the carbon source is soluble starch or dextrin and the nitrogen source is yeast extract, casamino acid or ammonium sulfate.

6. The method according to claim 2, wherein the cultivation is conducted at a temperature of 27 to 30° C. for 48 to 96 hours.

7. The method according to claim 2, wherein the culture broth is filtered to collect a culture filtrate containing the hyaluronidase and the hyaluronidase is collected from the culture filtrate by precipitation with an organic solvent or salting out.

8. The method according to claim 2, wherein the culture broth is filtered to collect a culture filtrate containing the hyaluronidase and the hyaluronidase is collected from the culture filtrate by concentration and precipitation with an organic solvent.

9. The method according to claim 2, wherein the culture broth is filtered to collect a culture filtrate containing the hyaluronidase and the hyaluronidase is collected from the culture filtrate by concentration and salting out.

References Cited

Kaneko et al.: New Hyaluronidase Produced by Streptomyces, Agr. Biol. Chem., vol. 31, No. 12, 1967 (pp. 1515–1516).

A. LOUIS MONACELL, Primary Examiner

D. M. NAFF, Assistant Examiner

U.S. Cl. X.R.

195—66 R